(12) United States Patent
Lee et al.

(10) Patent No.: US 7,414,868 B2
(45) Date of Patent: Aug. 19, 2008

(54) SWITCHED CURRENT POWER CONVERTER WITH PARTIAL CONVERTER DECOUPLING FOR LOW LOAD CONDITIONS

(75) Inventors: William Lee, Shen Zhen (CN); Lucy Zhong, Meixian (CN); Horace Liang, Zhaoqing (CN); Owen Jiang, Shenzhen (CN)

(73) Assignee: Astec International Limited, Kwun Tong, Kowloon (HK)

( * ) Notice: Subject to any disclaimer, the term of this patent is extended or adjusted under 35 U.S.C. 154(b) by 63 days.

(21) Appl. No.: 11/157,114

(22) Filed: Jun. 20, 2005

(65) Prior Publication Data

US 2006/0285370 A1    Dec. 21, 2006

(51) Int. Cl.
*H02J 1/10* (2006.01)
*G05F 1/59* (2006.01)
(52) U.S. Cl. .................. 363/65; 323/272; 363/134
(58) Field of Classification Search ........... 323/368, 323/271, 272; 363/24–26, 65, 71, 133, 134
See application file for complete search history.

(56) References Cited

U.S. PATENT DOCUMENTS

| 4,050,789 | A | 9/1977 | Herbert |
|---|---|---|---|
| 4,148,563 | A | 4/1979 | Herbert |
| 4,150,423 | A | 4/1979 | Boschert |
| 4,665,357 | A | 5/1987 | Herbert |
| 4,845,606 | A | 7/1989 | Herbert |
| 4,916,576 | A | 4/1990 | Herbert et al. |
| 4,942,353 | A | 7/1990 | Herbert et al. |
| 4,978,906 | A | 12/1990 | Herbert et al. |
| 5,014,261 | A | 5/1991 | Shinbashi et al. |
| 5,093,646 | A | 3/1992 | Herbert |
| 5,132,606 | A | 7/1992 | Herbert |
| 5,144,222 | A | 9/1992 | Herbert |
| 5,297,617 | A | 3/1994 | Herbert |
| 5,346,327 | A | 9/1994 | Herbert |
| 5,445,215 | A | 8/1995 | Herbert |
| 5,479,146 | A | 12/1995 | Herbert |
| 5,659,455 | A | 8/1997 | Herbert |
| 5,910,879 | A | 6/1999 | Herbert |
| 5,923,523 | A | 7/1999 | Herbert |
| 5,999,078 | A | 12/1999 | Herbert |
| 6,016,095 | A | 1/2000 | Herbert |
| 6,115,267 | A | 9/2000 | Herbert |
| 6,121,761 | A | 9/2000 | Herbert |
| 6,125,920 | A | 10/2000 | Herbert |
| 6,137,392 | A | 10/2000 | Herbert |
| 6,144,566 | A * | 11/2000 | Keller ..................... 363/21.12 |
| 6,232,754 | B1 | 5/2001 | Liebler et al. |
| 6,348,848 | B1 | 2/2002 | Herbert |
| 6,549,411 | B1 | 4/2003 | Herbert |
| 6,578,253 | B1 | 6/2003 | Herbert |
| 6,696,823 | B2 | 2/2004 | Ledenev et al. |

(Continued)

*Primary Examiner*—Gary L Laxton
(74) *Attorney, Agent, or Firm*—Harness, Dickey & Pierce, P.L.C.

(57) ABSTRACT

A switched current power converter including an input power source, an output terminal, and a plurality of current stages. Each current stage includes a converter coupled to the input power source for providing a current, and a switch circuit for selectively coupling the current in such current stage to the output terminal. A control circuit selectively decouples the input power source from less than all of the current stage converters upon detecting a low load condition, thereby reducing circulating current losses and improving operating efficiency under low load conditions.

19 Claims, 7 Drawing Sheets

U.S. PATENT DOCUMENTS

| | | |
|---|---|---|
| 6,734,778 B2 | 5/2004 | Herbert |
| 6,838,863 B2 * | 1/2005 | Hazucha et al. ............. 323/282 |
| 6,897,641 B1 | 5/2005 | Herbert |
| 6,963,497 B1 | 11/2005 | Herbert |
| 6,966,357 B1 | 11/2005 | Herbert |
| 6,979,982 B2 * | 12/2005 | Herbert ..................... 323/272 |
| 6,981,878 B1 | 1/2006 | Herbert |
| 6,992,520 B1 | 1/2006 | Herbert |
| 6,992,906 B1 | 1/2006 | Herbert |
| 7,023,317 B1 | 4/2006 | Herbert |
| 7,071,807 B1 | 7/2006 | Herbert |
| 7,075,802 B2 | 7/2006 | Yamashita |
| 7,098,638 B1 | 8/2006 | Herbert |
| 7,116,014 B1 | 10/2006 | Herbert |
| 7,119,648 B1 | 10/2006 | Herbert |
| 7,136,285 B1 | 11/2006 | Herbert |
| 7,139,180 B1 | 11/2006 | Herbert |
| 7,170,764 B2 | 1/2007 | Vinciarelli |
| 7,212,419 B2 * | 5/2007 | Vinciarelli ................... 363/65 |
| 2005/0237036 A1 | 10/2005 | Nguyen et al. |
| 2007/0025127 A1 | 2/2007 | McGarry et al. |

* cited by examiner

SWITCHED CURRENT POWER CONVERTER WITH PARTIAL CONVERTER DECOUPLING FOR LOW LOAD CONDITIONS

FIELD OF THE INVENTION

The present invention relates to power supplies including switched current power converters having low circulating current losses under low load conditions.

BACKGROUND OF THE INVENTION

A wide variety of electric power supplies have been developed for use with integrated circuits and other devices. Some common examples include DC/DC converters and voltage regulation modules (VRMs). In many applications, including those utilizing low voltage digital circuitry such as microprocessors, the power supply must provide a fast dynamic response to changes or variations in the load or load requirements.

A typical DC/DC converter may convert a DC voltage supplied from one or more power sources to a desired voltage. This can be accomplished using switching devices that selectively couple one or more current sources either to the power supply output or to a return. By dynamically controlling the on/off timing of each switching device, the number of current sources supplying current to the output, and thus the amount of output current supplied to the load, can be dynamically controlled. This is particularly useful when the load current demand varies and the output voltage is desired to remain at a nominal value, or within a range of values.

When the load current demand on the output becomes low, the amount of current switched to the return (referred to as circulating current) typically increases. These circulating currents usually remain active and thus available for dynamic switching from the return to the output in response to an increase in the load current demand.

As recognized by the inventors hereof, one disadvantage of many known power supplies is the amount of power that is consumed or wasted by circulating current. As such, the inventors have identified a need for a power supply having reduced power losses under low load conditions while maintaining a satisfactory dynamic response to changing load requirements.

SUMMARY OF THE INVENTION

The inventors hereof have succeeded at designing switched current power converters having reduced power losses under low load conditions while, in many embodiments, maintaining a fast dynamic response to changes in the load current demand.

According to one aspect of the invention, a switched current power converter includes an input power source, an output terminal, a plurality of current stages, and a control circuit. Each current stage includes a converter coupled to the input power source for providing a current, and a switch circuit for selectively coupling the current in such current stage to the output terminal. The control circuit is configured for decoupling the input power source from less than all of the current stage converters upon detecting a low load condition.

According to another aspect of the invention, a switched current power converter includes an input power source, a transformer having at least one primary coupled to the input power source and a plurality of secondaries, a plurality of branch circuits each coupled to one of the transformer secondaries, and a control circuit. Each branch circuit includes a switch circuit for selectively coupling a branch current to one of an output terminal and ground. The control circuit is configured for controlling the switch circuit of each branch circuit and detecting a low load condition, and for selectively decoupling the input power source from less than all of the secondaries during the low load condition.

According to yet another aspect of the invention, a switched current power converter includes an input power source, a transformer having at least one primary coupled to the input power source and at least N secondaries, at least N branch circuits each coupled to one of the transformer secondaries, and a control circuit. Each branch circuit includes a switch circuit for selectively coupling a branch current to one of an output terminal and ground. The control circuit is configured for controlling the switch circuit of each branch circuit and detecting a low load condition, and for selectively decoupling the input power source from M of the secondaries during the low load condition, where N and M are integers and $1 \leq M < N$.

Further aspects of the present invention will be in part apparent and in part pointed out below. It should be understood that various aspects of the invention may be implemented individually or in combination with one another. It should also be understood that the detailed description and drawings, while indicating certain exemplary embodiments of the invention, are intended for purposes of illustration only and should not be construed as limiting the scope of the invention.

BRIEF DESCRIPTION OF THE DRAWINGS

Like reference symbols indicate like elements or features throughout the drawings.

DETAILED DESCRIPTION OF EXEMPLARY EMBODIMENTS

Figure 1:
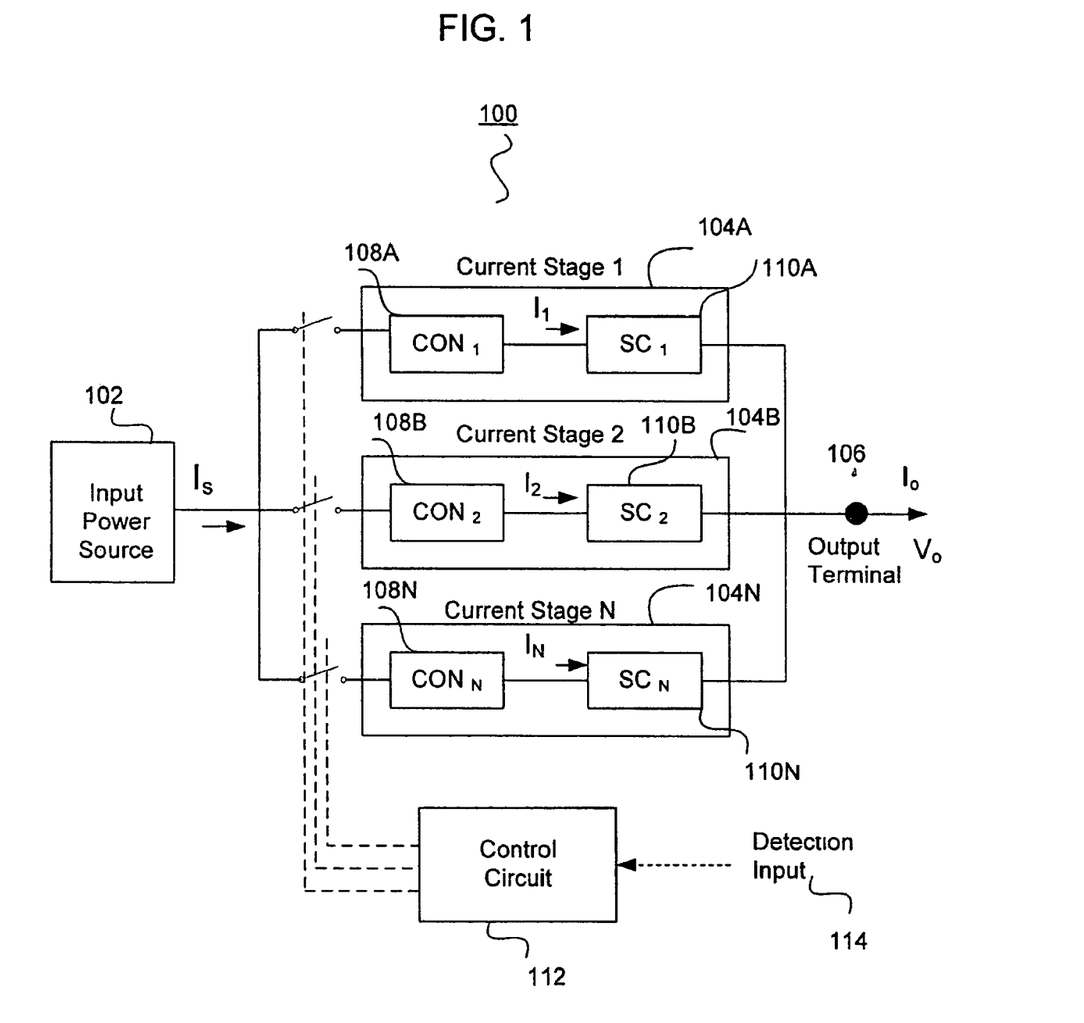
FIG. 1 is a block diagram of a switched current power converter according to one embodiment of the invention.

A switched power converter according to one exemplary embodiment of the present invention is illustrated in FIG. 1 and indicated generally by reference numeral 100. As shown in FIG. 1, the power supply 100 includes an input power source 102 for providing a supply current $I_S$. Additionally, the power supply 100 includes several current stages 104A, 104B, ... 104N. Each current stage 104 includes a converter 108A, 108B, ... 108N coupled to the input power source 102 for providing a current $I_1, I_2, ... I_N$, and a switch circuit 110A, 110B, ... 110N for selectively coupling the current of each current stage to an output terminal 106, and thus to a load (not shown) coupled to the output terminal 106. The converter 100 further includes a control circuit 112 for decoupling the input power source 102 from less than all the current stage converters 108 upon detecting a low load condition. As a result, the operating efficiency of the converter 100 can be improved under low load conditions while maintaining a fast dynamic response to changes in the output current $I_o$ demanded by the load.

Although FIG. 1 illustrates the input power source 102 coupled to the converters 108 via switches under control of the control circuit 112, it should be understood that this is for illustrative purposes and that a wide variety of switching and other devices can be employed for coupling and/or decoupling the input power source 102 from one or more of the current stage converters 108.

In some embodiments, the current provided by one of the current stages 104 is at least as great as the maximum output current $I_o$ demanded by the load during a low load condition. As a result, the control circuit can decouple the input power source 102 from all but one of the current stage converters 108 during the low load condition. In other embodiments, two or more converters 108 may remain coupled to the input power source 102 during the low load condition.

The low load condition may be defined as desired for any given application of the invention. In some embodiments, the low load condition is deemed established when the output current $I_o$ is approximately 10% or less of the maximum rated output current of the converter 100. However, other percentages and/or parameters can be employed to define a low load condition. Further, multiple low load conditions (e.g., corresponding to multiple low load current levels) may be defined and implemented in any given application without departing from the scope of the present invention.

As shown in FIG. 1, the control circuit 112 may include one or more inputs 114 for detecting the low load condition. By way of example, the input 114 can be coupled to an external source (e.g., a sensor, a switch, a signal processing circuit, an operator input, the load, etc.) that provides a logic signal to the control circuit 112 when the low load condition is established. Alternatively, the control circuit 112 may itself determine when a low load condition is established by detecting one or more voltage or current levels via one or more inputs 114. The control circuit 112 may include a logic circuit for this purpose, as further explained below.

In some embodiments, the control circuit 112 is also configured for controlling operation of the switch circuits 110 to control the amount of output current $I_o$ supplied to the output terminal 106 and thus to the load. As apparent to those skilled in the art, the output current $I_O$ is the sum of the currents selectively coupled to the output terminal 106 by the switch circuits 110.

The input power source 102 can be any suitable power source including a constant current or voltage source, by way of example. Further, while not shown in FIG. 1, one or more capacitors can be coupled to the output terminal 106 for smoothing the output voltage $V_O$ and/or output current $I_O$.

Figure 2:
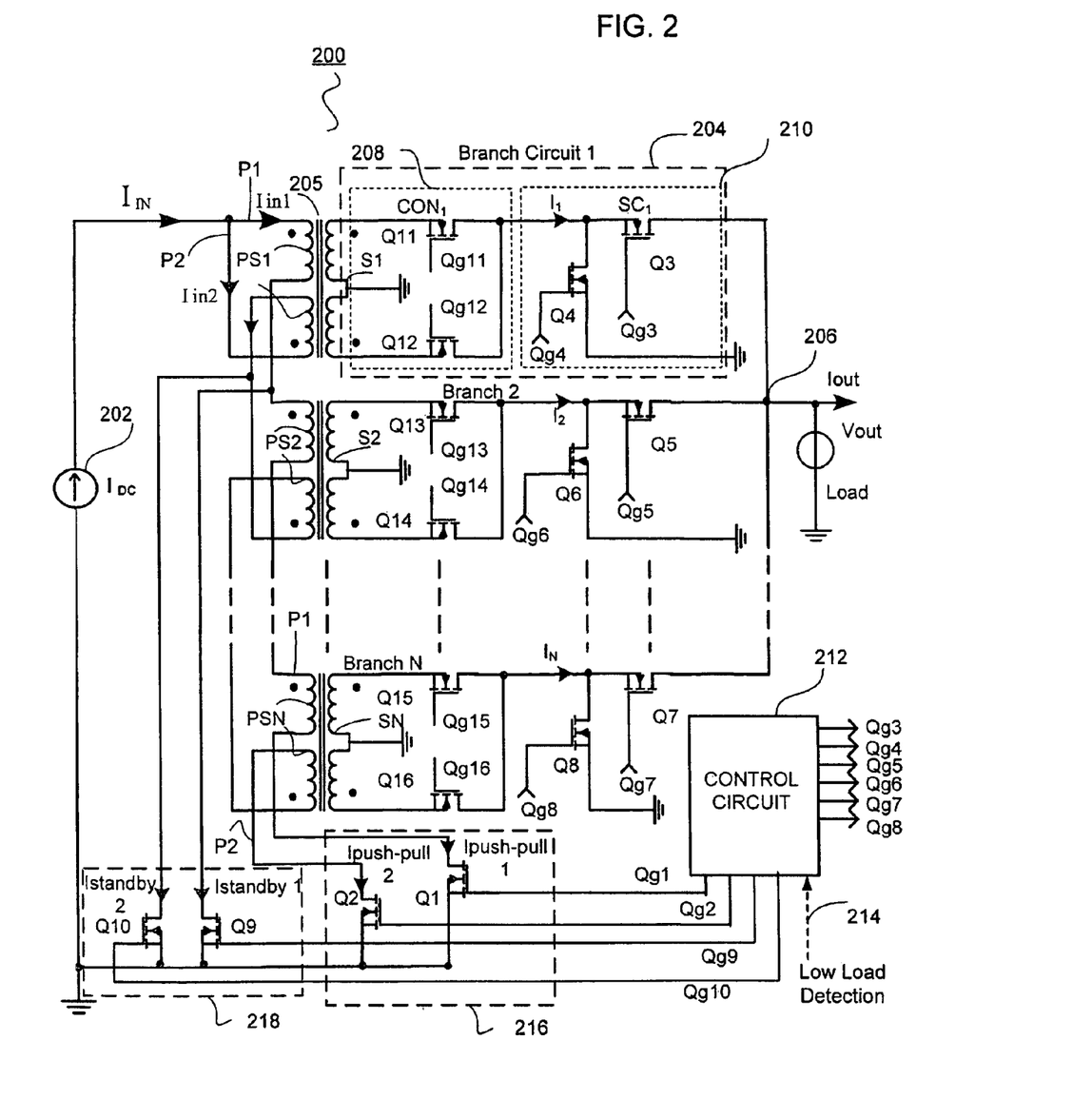
FIG. 2 is a circuit diagram of a switched current power converter according to another embodiment of the invention.

FIG. 2 illustrates a switched current power converter 200 according to another embodiment of the invention. As shown in FIG. 2, the converter 200 includes an input power source 202 (e.g., a current source) for energizing a transformer 205 having two primaries P1, P2 and multiple secondaries S1, S2, . . . Sn. The primaries P1, P2 each couple a portion $I_{IN1}$, $I_{IN2}$, respectively, of the input current $I_{IN}$ to a plurality of branch circuits 204 for producing multiple branch currents I1, I2, . . . , In. Each branch circuit 204 includes a switch circuit 210 for selectively coupling its associated branch current I1, I2, . . . , In to an output terminal 206 of the converter 200. The converter 200 further includes a control circuit 212 for controlling, among other things, operation of the switch circuits 210.

The control circuit 212 is configured to selectively decouple the input power source 202 from less than all of the secondaries S1, S2, . . . , Sn during a low load condition, as further explained below. Similar to the control circuit 112 of FIG. 1, the control circuit 212 includes one or more inputs 214 for detecting the low load condition.

In the embodiment of FIG. 2, the primaries P1, P2 include multiple primary segments PS1, PS2, . . . , PSn that are each coupled to a different one of the secondaries S1, S2, . . . , Sn. Further, each secondary S1, S2, . . . , Sn has a center tap connected to ground and two terminals each connected to one of the branch circuits 204.

During normal operation of the converter 200 (i.e., when the converter is not operating in a low load condition), each primary winding segment PS1, . . . , PSn is energized by the input currents $I_{IN1}$, $I_{IN2}$ under the control of a first push-pull circuit 216. In the embodiment of FIG. 2, the first push-pull circuit 216 includes FET switching transistors Q1 and Q2 to alternately energize the primaries P1, P2 in response to control signals Qg1 and Qg2, respectively, from the control circuit 212. During such operation, the transistors Q1 and Q2 operate as a synchronous push-pull switching circuit for providing a complementary square wave current signal to the primaries P1, P2. Typically, the control signals Qg1, Qg2 each have a 50% duty cycle such that each transistor Q1, Q2 is active 50% of the time. Thus, when Q1 is conducting (on), Q2 is non-conducting (off), and when Q2 is conducting, Q1 is non-conducting. In this manner, the transformer 205 couples power from the input power source 202 to each of the branch circuits 204 during normal operation of the converter 200.

More specifically, and using Branch Circuit 1 in FIG. 2 as an example, when primary P1 conducts current, switching transistor Q11 is on and provides a substantially constant current $I_1$ to the switch circuit 210. Alternately, when primary P2 conducts current, switching transistor Q12 is on and provides the substantially constant current $I_1$ to the switch circuit 210. Thus, control signals Qg11 and Qg12 are switched on and off in synchronization with the control signals Qg1, Qg2 for the first push-pull circuit 216. Further, the current I1 is selectively coupled to either the output terminal 206 (and thus the load) via switching transistor Q3 and control signal Qg3, or to ground via switching transistor Q4 and control signal Qg4. When the current I1 is switched to ground, the current I1 is a circulating current and reduces the operating efficiency of the converter 200. As shown in FIG. 2, the control signals for the branch circuits 204, as well as the control signals for the first push-pull circuit 216 and a second push-pull circuit 218, are provided by the control circuit 212.

During a low load condition, control circuit 212 deactivates the first push-pull circuit 216 and activates the second push-pull circuit 218. During such time, the second push-pull circuit 218 effectively bypasses each primary winding segment except primary winding segment PS1. In this manner, the control circuit 212 selectively decouples the input power source 202 from each branch circuit 204 except Branch Circuit 1. As a result, there are no circulating currents, and thus no circulating current losses, in any of the branch circuits except for possibly Branch Circuit 1 (where the current I1 may be successively switched between the output terminal 206 and ground as necessary to provide the required load current during the low load condition).

Although the second push-pull circuit 218 is shown in FIG. 2 as coupled between primary winding segments PS1 and PS2, it may alternatively be coupled between another pair of primary winding segments in other embodiments of the invention, including where it is desired to have multiple branch circuits coupled to the input power source 202 during a low load condition. The exemplary converter 200 of FIG. 2 includes N branch circuits, where N can be any integer greater than one.

Additionally, the substantially constant currents I1, I2, . . . , In that are selectively coupled to the output terminal 206 by the switch circuits 210 of FIG. 2 may have the same value or different values, as necessary or desired for any given application of the invention.

Figure 3:
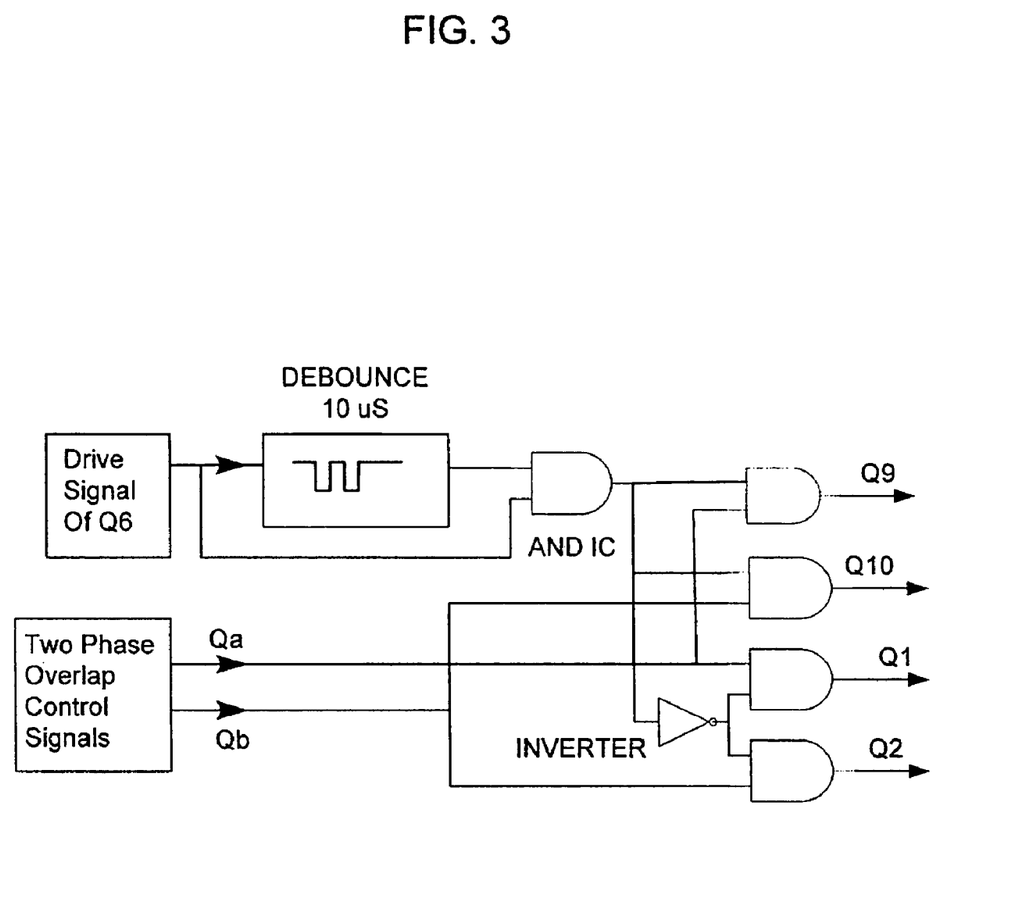
FIG. 3 is a block diagram of an overlap control circuit for driving the push-pull circuits of FIG. 2.
Figure 4:
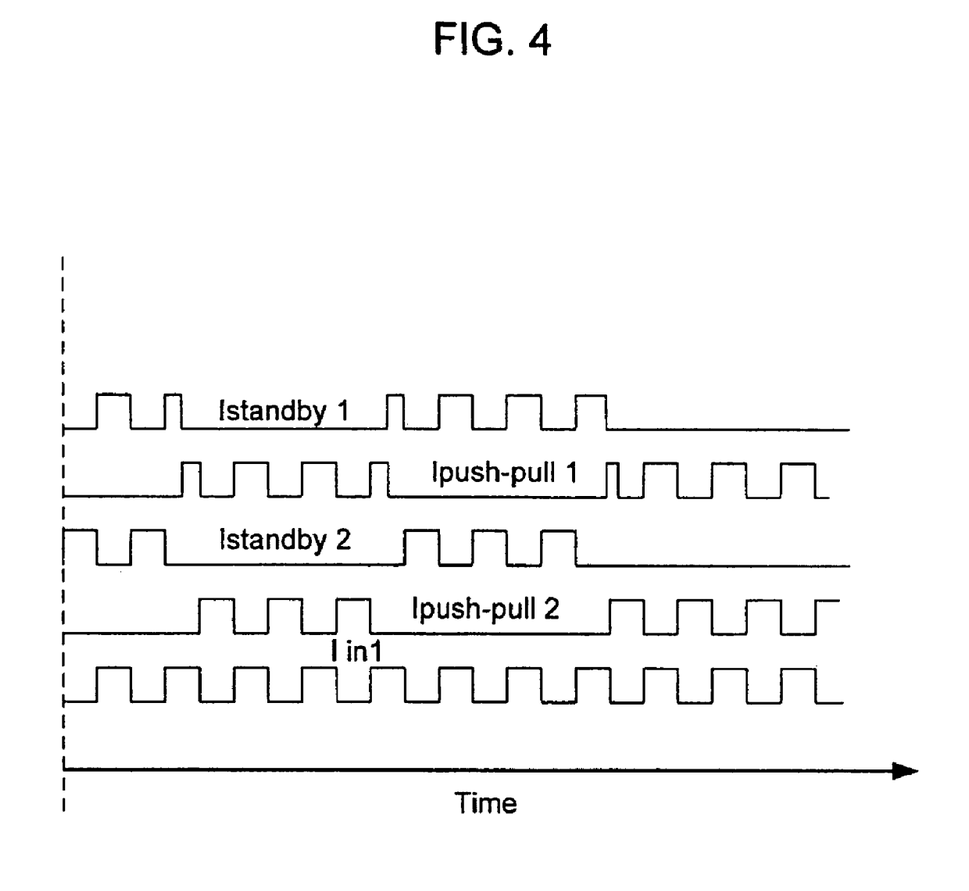
FIG. 4 is a timing diagram of the push-pull circuit currents in the converter of FIG. 2.

FIG. 3 illustrates an exemplary implementation of a portion of the control circuit 212 which produces the control signals Qg1, Qg2, Qg9, Qg10 for the first and second push-pull circuits 216, 218. In the exemplary embodiment of FIG. 3, the gate drive signal of transistor Q6 is used to switch push-pull circuit 216 "ON" and push-pull circuit 218 "OFF", or vice versa. FIG. 4 illustrates exemplary currents through transistors Q1, Q2, Q9 and Q10 for the converter 200 of FIG. 2.

Figure 5:
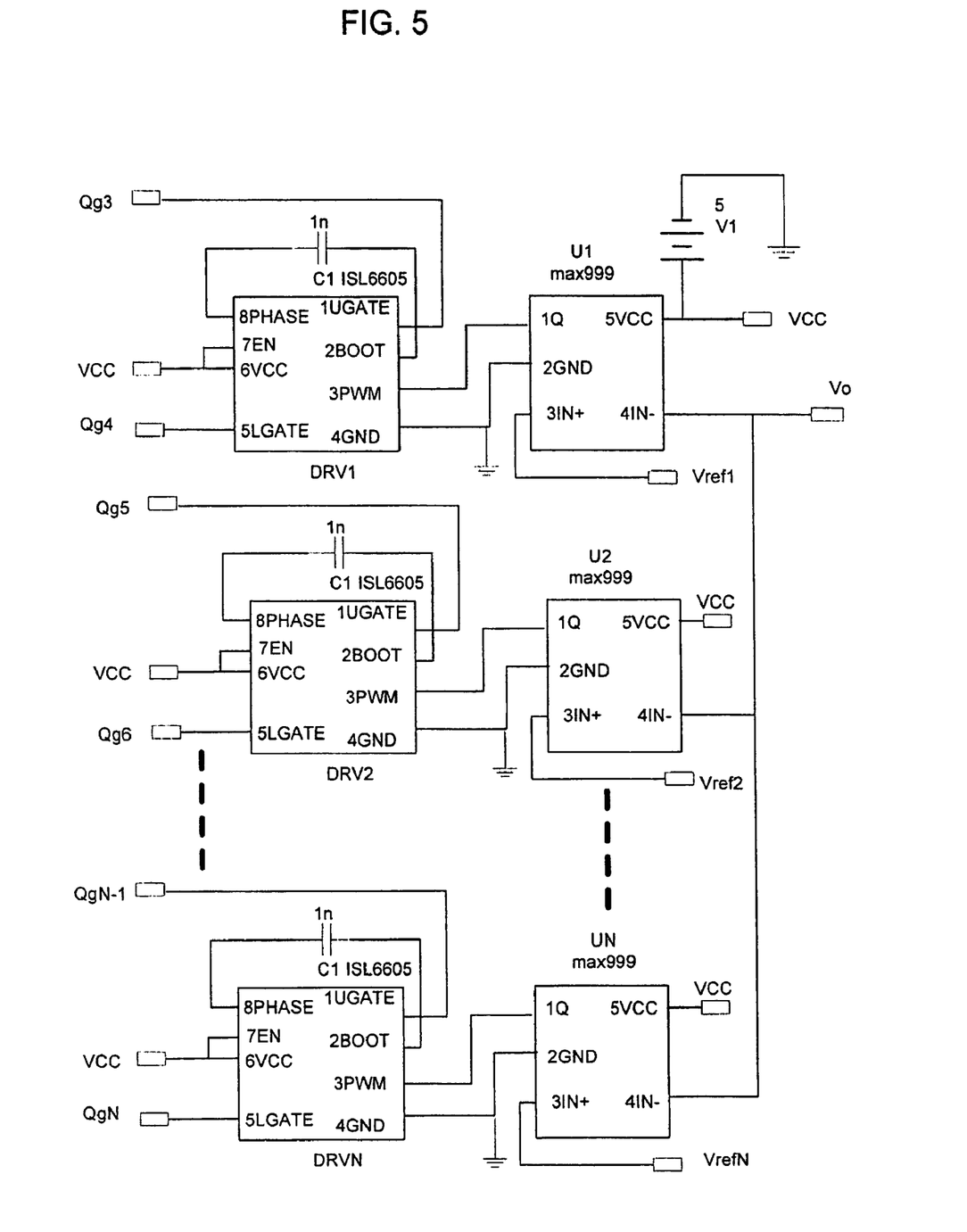
FIG. 5 is a partial circuit diagram of the control circuit shown in FIG. 2.

FIG. 5 illustrates an exemplary implementation of a portion of the control circuit 212 which produces the control signals Qg3-Qg8 provided to the switch circuits 210. In this embodiment, comparators U1-UN compare the output voltage, Vo, to a series of scaled reference voltages Vref1-VrefN to selectively switch the output state of drive signal circuits DRV1-DRVN, and thus the state of control signals Qg3-QgN.

Figure 6:
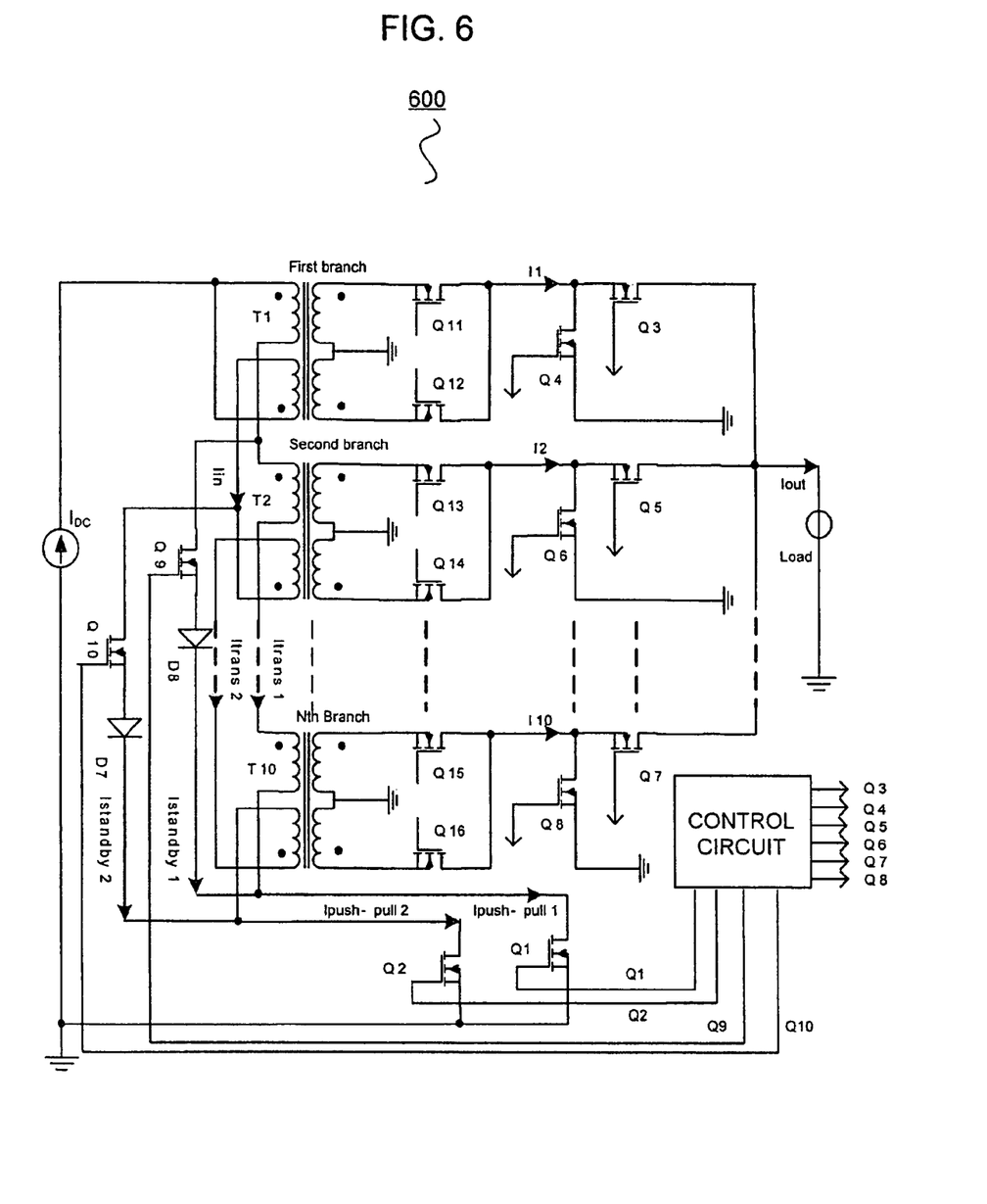
FIGS. 6 and 7 are circuit diagrams of switched current power converters according to additional embodiments of the invention.

FIG. 6 illustrates a switched current power converter 600 according to another embodiment of the invention. In this embodiment, transistors Q9 and Q10 are activated during a low load condition, in conjunction with transistors Q1 and Q2, to decouple the input power source from each branch circuit except the first branch. Reverse diodes D7 and D8 operate to prevent reverse current from flowing through transistors Q9 and Q10 during normal operation of the converter 600.

Figure 7:
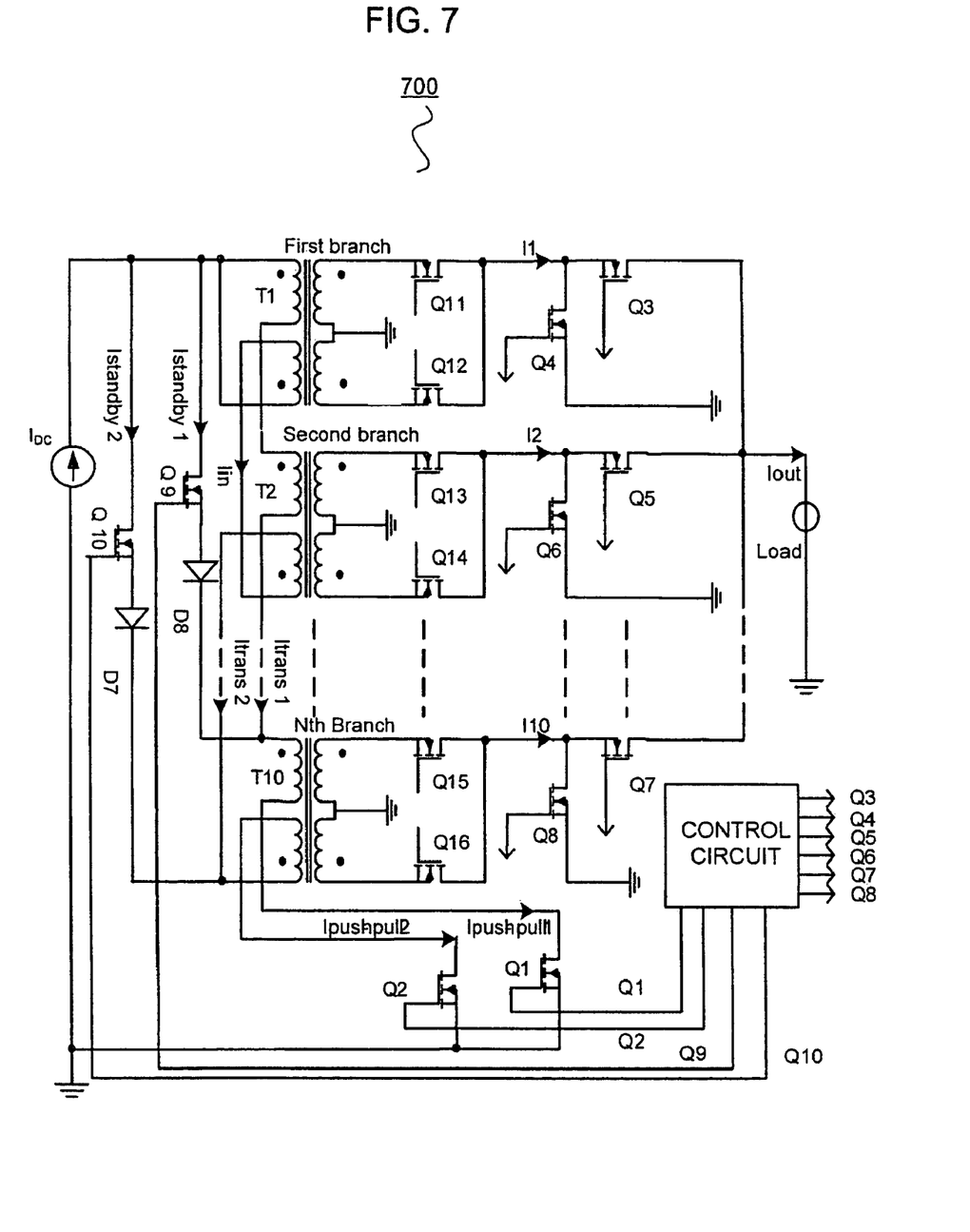

FIG. 7 illustrates a switched current power converter 700 according to another exemplary embodiment of the invention. In this embodiment, transistors Q9 and Q10 are activated during a low load condition, in conjunction with transistors Q1 and Q2, to decouple the input power source from each branch circuit except the Nth branch. Diodes D7 and D8 prevent reverse current from flowing through transistors Q9 and Q10 during normal operation of the converter 700.

In one application of the present invention, a switched current power converter is required to provide a maximum rated output current of one hundred amperes (100A). In this particular embodiment, the input power source is a ten amp constant current source (e.g., a modified buck converter) selectively coupled to ten branch circuits, with each branch circuit capable of providing ten amps of current to the output terminal. During normal operation of this particular converter, nine of the ten branch circuits are usually fully on or fully off as necessary to provide additional load current in ten amp increments. The other branch circuit is pulse width modulated as necessary to provide between zero and ten amps of additional current to the output terminal. For example, if the load current demand during normal operation is twenty-five amps, two of the branch circuits are fully on (each providing ten amps of current to the output terminal), one of the branch circuits is switched on 50% of the time (to thereby provide five amps of current to the output terminal), and the remaining branch circuits are fully off. It should be understood, however, that the selection of the input power source, the number of branch circuits, the maximum rated output current, the amount of current provided by each branch circuit, the manner in which the branch circuits are switched and controlled to provide the desired output current, and other implementation details can be varied as necessary or desired for any given application of the present invention.

When describing elements or features of the present invention or embodiments thereof, the articles "a", "an", "the" and "said" are intended to mean there are one or more of such elements or features. The terms "comprising", "including" and "having" are intended to be inclusive and mean there may be additional elements or features beyond those specifically described.

Those skilled in the art will recognize that various changes can be made to the exemplary embodiments and implementations described above without departing from the scope of the present invention. Accordingly, all matter contained in the above description or shown in the accompanying drawings should be interpreted as illustrative and not in a limiting sense.

What is claimed is:

1. A switched current power converter comprising:
a constant current source;
an output terminal;
a plurality of current stages, each current stage including a converter coupled to the constant current source for providing a current and a switch circuit for selectively coupling the current in such current stage to the output terminal; and
a control circuit for controlling the switch circuits in said current stages to selectively couple current from the plurality of current stages to the output terminal at the same time, the control circuit configured for decoupling the constant current source from less than all of the current stage converters upon detecting a low load condition.

2. The power converter of claim 1 wherein the control circuit is configured for decoupling the constant current source from all but one of the current stage converters upon detecting the low load condition.

3. The power converter of claim 1 wherein the current in each current stage is a substantially constant current.

4. The power converter of claim 1 further comprising a transformer having a plurality of secondaries, the current stage converters including the plurality of secondaries.

5. A switched current power converter comprising:
a constant current source;
a transformer having at least one primary coupled to the constant current source and a plurality of secondaries;
a plurality of branch circuits each coupled to one of the transformer secondaries, each branch circuit including a switch circuit for selectively coupling a branch current to one of an output terminal and ground;
a control circuit for controlling the switch circuits in said branch circuits to selectively couple current from the plurality of branch circuits to the output terminal at the same time, the control circuit configured for detecting a low load condition, the control circuit selectively decoupling the constant current source from less than all of the secondaries during the low load condition.

6. The switched current power converter of claim 5 wherein the control circuit is configured to disable a portion of the at least one primary during the low load condition.

7. The switched current power converter of claim 6 wherein the control circuit is configured to detect the low load condition via an input from an external source.

8. The switched current power converter of claim 6 wherein said at least one primary includes a first primary and a second primary, the power converter further comprising a first push-pull circuit coupled to the first and second primaries, the control circuit configured to disable the first push-pull circuit during the low load condition.

9. The switched current power converter of claim 8 further comprising a second push-pull circuit coupled to the first and second primaries, the control circuit configured to enable the second push-pull circuit during the low load condition.

10. The switched current power converter of claim 9 wherein the second push-pull circuit is coupled to intermediate portions of the first and second primaries, the second push-pull circuit effectively bypassing portions of the first and second primaries when the first push-pull circuit is disabled and the second push-pull circuit is enabled.

11. The switched current power converter of claim 5 wherein the constant current source is a buck converter.

12. The switched current power converter of claim 5 wherein the constant current source is the only input power source of the power converter.

13. The switched current power converter of claim 5 wherein the low load condition is from zero to approximately 10% of full load.

14. The switched current power converter of claim 5 wherein the control circuit selectively decouples the constant current source from all but one of the secondaries during the low load condition.

15. The switched current power converter of claim 5 wherein the control circuit is configured for maintaining a voltage at the output terminal at a desired level.

16. The switched current power converter of claim 5 wherein the control circuit includes a logic circuit for detecting the low load condition.

17. A switched current power converter comprising:
 a constant current source;
 a transformer having at least one primary coupled to the constant current source and at least N secondaries;
 at least N branch circuits each coupled to one of the transformer secondaries, each branch circuit including a switch circuit for selectively coupling a branch current to one of an output terminal and ground; and
 a control circuit for controlling the switch circuit of each branch circuit to selectively couple current from the N branch circuits to the output terminal at the same time, the control circuit configured for detecting a low load condition, the control circuit selectively decoupling the constant current source from M of the secondaries during the low load condition, where N and M are integers and $1 \leq M < N$.

18. The switched current power converter of claim 17 wherein M=N−1.

19. The switched current power converter of claim 17 wherein the control circuit includes a logic circuit for detecting the low load condition as a function of at least one switch state in at least one of the switch circuits.

* * * * *